J. W. LADD.
STUFFING BOX.
APPLICATION FILED JAN. 16, 1908.

923,671.

Patented June 1, 1909.

WITNESSES:
J. Ray Abbey
Ralph S. Warfield

INVENTOR
John W. Ladd
BY
Geo. B. Willcox
ATTORNEY

THE NORRIS PETERS CO., WASHINGTON, D. C.

UNITED STATES PATENT OFFICE.

JOHN W. LADD, OF SAGINAW, MICHIGAN.

STUFFING-BOX.

No. 923,671.    Specification of Letters Patent.    Patented June 1, 1909.

Application filed January 16, 1908.  Serial No. 411,125.

*To all whom it may concern:*

Be it known that I, JOHN W. LADD, a citizen of the United States, residing at Saginaw, in the county of Saginaw and State of Michigan, have invented certain new and useful Improvements in Stuffing-Boxes; and I do hereby declare the following to be a full, clear, and exact description of the invention, such as will enable others skilled in the art to which it appertains to make and use the same.

My invention relates to stuffing boxes, one object of which is to provide a device of this character having a yielding liquid-tight joint between a stationary part of the box and a moving element.

Another object is to provide a clean sanitary stuffing box capable of immersion and operation in cream or other liquid without befouling the liquid.

A further object is to provide a stuffing box capable of automatically accommodating itself to the expansion and contraction of an element within a vat or other receptacle with which the box may be associated.

A further object is the provision of a stuffing box provided with a shaft bearing which can be easily removed and replaced for repairs or inspection.

My invention further consists in certain novel features and combinations which will be more fully described hereinafter and particularly pointed out in the claims.

Figure 1:
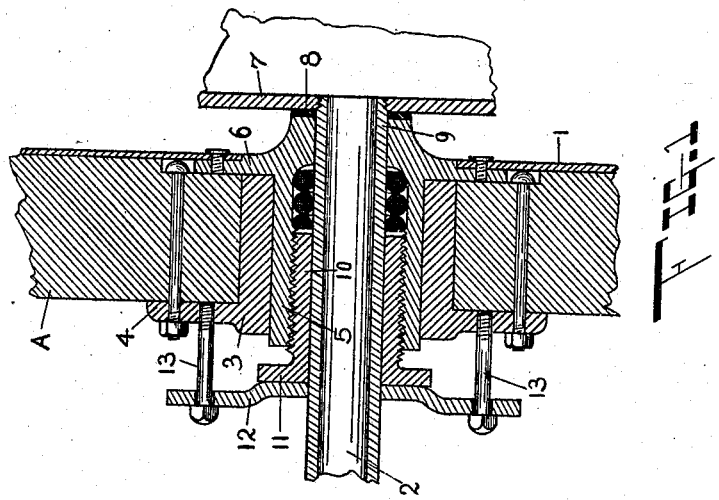
Figure 2:
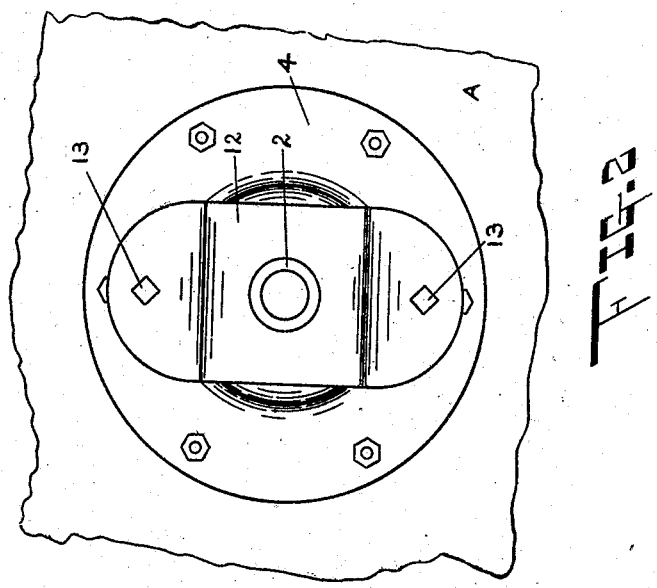

In the accompanying drawings, Figure 1 is a vertical cross-sectional view through one form of my invention; and Fig. 2 is an end elevation looking in the direction of the arrow, Fig. 1.

While I have shown and described my invention as applied to a liquid ripener, it is obvious that it can be used wherever a stuffing box is necessary, and I do not confine myself to its use in the creamery art.

As is well known, it is absolutely essential that all machinery for handling dairy products must be clean and sanitary. In ripening cream for making butter, for instance, the cream is turned into a large metal-lined vat wherein is located a series of tubes, the ends of which tubes are seated in headers, from which project hollow shafts passing through the ends of the vat and communicating with any source of liquid supply, generally water. The shafts are rotated so that the series of tubes and their headers rotate in the vat. It is obvious that the openings in the metallic lining at the ends of the vat must be suitably packed to prevent leakage of the cream, and preferably the stuffing box should be impenetrable to liquid, in order not to impregnate the cream. Furthermore, the metallic tubes or other devices in the vat are subject to expansion and contraction due to the varying temperatures to which they are subjected and the stuffing box must be so constructed as to accommodate itself automatically not only to the contraction but also to the expansion movement of the tubes or other devices without buckling, breaking, becoming loose or permitting access of the cream to the interior of the stuffing box. It is also desirable that the shaft bearing be easily accessible at all times for repairs, inspection or lubrication without necessitating a dismantling of the entire machine. My invention is designed to attain all these advantages, and while applicable to creamery or other liquid receptacles, it is also capable of use in other mechanisms and under other conditions.

In the drawings, (A) indicates one end wall of a vat, for instance, provided with a metallic lining (1). The shaft, which may be hollow, as shown, is indicated at (2), and passes through an aperture in the wall (A) and the lining (1). A bushing 3 is received in the opening, such bushing being preferably though not necessarily cylindrical and provided with a flange (4), which flange may, if desired, be secured to the exterior of the wall (A) of the vat. Slidingly received in the smooth bore of the bushing is a sleeve (5). This sleeve surrounds the shaft (2) but does not engage the shaft and is in no sense a bearing therefor. The metallic lining (1) is secured to the adjacent end of the sleeve in any suitable manner. As one means, however, I have shown the sleeve as being provided with a flange (6) near its inner end, to which flange is secured the metallic lining (1) of the vat. The lining is capable of a limited movement or flexure relative to the wall (A) of the vat. The inner end of the sleeve is adapted to abut against a movable or rotary member, such as the agitator (7), a fragment of which is shown, and a fiber or other suitable ring (8) may be interposed between the end of the sleeve and the member (7). The engagement of the inner end of the sleeve and header forms a liquid tight joint to prevent access of the liquid in the vat to the stuffing box. Interiorly the bore of the sleeve (5) may be formed on two diameters. The larger bore is located at the outer end of the sleeve and may be threaded to receive the exteriorly threaded end of a gland (10), suitable packing being confined in the sleeve between the inner end of the gland and the contracted bore (9), the contraction of which forms an abutment for the packing. The outer end of the gland may be flanged at (11), if desired, the smooth bore of the gland fitting around the shaft (2), and constituting a readily accessible and easily removable bearing therefor. The bore of the gland is preferably smaller than the contracted bore (9) of the sleeve.

It is desirable to provide yielding means for taking up the contraction and accommodating the expansion of the agitator, as well as taking up any wear and thus maintain a tight joint between the inner end of the sleeve and the agitator. This may be accomplished in various ways but as one such means I have shown the following construction. A perforated plate-spring (12) is received around the shaft (2) and bears against the outer end of the gland (10), tension being placed on the spring by means of bolts or screws (13) (13) passing through the ends of the spring and into the wall (A) of the vat. It will be seen that the sleeve (5) is slidable longitudinally in the bushing (3). The tension of spring (12) operates to retain the inner end of the sleeve tightly against the movable member (7) and prevents the entrance of liquid from the vat to the interior of the box. In case the agitator (7) should move outwardly to accommodate the expansion of the tubes, for instance, the sleeve is pushed outward against the tension of the spring (12), and when the tubes contract and the agitator moves inward, the spring causes the sleeve to automatically follow the agitator. A liquid tight joint is maintained at all times.

The lining is capable of flexure laterally toward and from the wall (1), and the sleeve always forms a tight joint with the lining by reason of the fact that the lining is rigidly secured thereto. It is also to be observed that no oil or grease can exude from the box into the vat or mingle with the contents of the vat.

The formation of a liquid tight joint between the inner end of the sleeve and the agitator or other element capable of a lateral or longitudinal movement is of great value, such joint being maintained automatically. It has been customary to provide a stuffing box, the stationary sleeve of which, as in the present instance, was composed of brass, which sleeve engaged the brass header or other independent member. The wear between the brass surfaces soon formed a space which admitted the cream and such cream was discolored by contact with the opposed surfaces. Also the cream was liable to penetrate the stuffing box and become impregnated with lubricant. In my invention, the surfaces are preferably though not necessarily held apart from each other by a washer, and in any event, a tight joint is formed between these surfaces by reason of the spring and sliding sleeve. It has also been customary to provide a sliding bearing for the shaft which bearing was also secured to the metallic lining, the inner end of the bearing engaging the header to form a tight joint. No automatic means was provided for accommodating the expansion and contraction of the agitator. Instead screws were employed to maintain a tight joint between the bearing and the agitator. The disadvantages pertaining to this construction are many. No bushing was provided between the sliding sleeve and the end of the vat; if the screws held the bearing tightly against the agitator when the latter was contracted, a subsequent expansion would buckle the tubes. On the other hand, if the screws were not tightened to hold the bearing against the agitator an open joint would result. It would require an operator in constant attendance to tighten and loosen the screws as the tubes expanded and contracted and even then a tight joint would not always be maintained. Another great disadvantage was that the bearing could not be removed without tearing the whole machine apart, because of the connection between the lining and the bearing. My invention provides an automatic liquid tight joint and permits the bearing to be removed and replaced without dismantling the machine.

From the foregoing it is plain that changes might be made in the form and arrangements of the several parts described without departing from the spirit and scope of my invention.

Having thus fully disclosed my invention, what I claim as new is:—

1. The combination with a liquid containing receptacle, an agitator within the receptacle, the agitator being subject to expansion and contraction, and a shaft secured to the agitator and passing through one wall of the receptacle, of a slidable sleeve encircling the shaft and extending through the wall of the receptacle, one end of the sleeve abutting the agitator, a bearing for the shaft, the bearing removably engaging the sleeve, and means for yieldingly retaining the inner end of the sleeve against the agitator to form a liquid tight joint and accommodate the expansion and contraction of the agitator.

2. The combination with a liquid containing receptacle, a rotatable member subject to expansion and contraction located in the receptacle and a shaft secured to the member and passing through one wall of the receptacle, of a stationary bushing in the wall through which the shaft extends, a sleeve slidably received in the bushing and encircling the shaft, one end of the sleeve projecting into the receptacle to engage the member, a gland connected to the opposite end of the sleeve and constituting a removable bearing for the shaft, and means for retaining the inner end of the sleeve in constant yielding engagement with the member to accommodate its expansion and take up its contraction.

3. A stuffing box comprising a bushing, a sleeve slidably received therein and having a bore formed on two diameters, a shaft passing through the sleeve, a gland threaded into the outer larger end of the sleeve and constituting a bearing for the shaft, packing in the sleeve between the inner end of the gland and the contracted bore of the sleeve, the inner end of the sleeve abutting a movable member and a spring for retaining the inner end of the sleeve yieldingly in contact with the member.

4. The combination with a receptacle adapted to contain liquid, a rotatable agitator in the receptacle subject to movement toward and from one wall of the receptacle, and a shaft connected to the agitator, the shaft extending through a wall of the receptacle, of a slidable sleeve encircling the shaft, one end of the sleeve projecting into the receptacle to engage the agitator, a bearing for the shaft formed independently of the sleeve, and means for automatically maintaining a liquid tight joint between the abutting surfaces of the sleeve and agitator notwithstanding the movement of the latter.

5. The combination with a receptacle adapted to contain liquid, an agitator in the receptacle and a shaft connected to the agitator, the shaft extending through the wall of the receptacle, of a slidable sleeve encircling the shaft, one end of the sleeve engaging the header, a metallic lining for the receptacle, the sleeve secured to the lining to form a tight joint, a bearing for the shaft formed independently of the sleeve and means for automatically maintaining a liquid tight joint between the abutting surfaces of the sleeve and agitator.

6. The combination with a receptacle having a metallic lining, an agitator within the receptacle subject to movement toward and from one wall of the receptacle, and a shaft passing through the wall of the receptacle, of a bushing surrounding the shaft, a sleeve slidably received in the bushing, the sleeve secured to the lining, one end of the sleeve projecting into the receptacle and abutting against the agitator, a bearing for the shaft removably engaging the outer end of the sleeve, and means for yieldingly retaining the end of the sleeve against the agitator to accommodate its movement and maintain a constant liquid tight joint.

7. A stuffing box comprising a slidable sleeve, one end of which is adapted to abut a member movable toward and from the sleeve, a shaft passing through the sleeve, a bearing for the shaft removably engaging the opposite end of the sleeve and means for yieldingly retaining the end of the sleeve against the member to form a liquid tight joint.

8. The combination with a receptacle having a lining, of a slidable sleeve, one end of which abuts a member movable toward and from the sleeve, the sleeve being connected to the lining to form a tight joint, a shaft passing through the sleeve and out of contact therewith, a bearing for the shaft removably engaging the opposite end of the sleeve and means for yieldingly retaining the end of the sleeve against the member to form a liquid tight joint.

9. A stuffing box comprising a stationary bushing, a slidable sleeve, one end of which is adapted to abut a member movable toward and from the sleeve, a shaft passing through the sleeve, a bearing for the shaft removably engaging the opposite end of the sleeve and means for yieldingly retaining the end of the sleeve against the member to form a liquid tight joint.

10. The combination with a receptacle, and a shaft passing through one wall thereof, of a stationary bushing in the wall encircling the shaft, a sleeve slidably received in the bushing, the inner end of the sleeve engaging a member movable toward and from the sleeve, a gland engaging the outer end of the sleeve and constituting a removable bearing for the shaft, and a spring engaging the gland to yieldingly retain the inner end of the sleeve in engagement with the member.

11. The combination with a receptacle having a lining, and a shaft extending through one wall thereof, of a slidable sleeve encircling the shaft, the sleeve secured to the lining, a member capable of movement toward and from the sleeve, one end of the sleeve engaging the member, a removable bearing for the shaft separate from the sleeve and yielding means for automatically maintaining the sleeve and member in constant engagement to form a tight joint.

In testimony whereof, I affix my signature in presence of two witnesses.

JOHN W. LADD.

Witnesses:
N. M. ANGUS,
RALPH S. WARFIELD.